United States Patent [19]

Hernandez et al.

[11] 4,321,596

[45] Mar. 23, 1982

[54] METHOD OF ALIGNING VIDEOTEX CHARACTERS AND DEVICE FOR CARRYING OUT SUCH A METHOD

[75] Inventors: Charles Hernandez, Villejuif; Jean-François Marquet, Clamart, both of France

[73] Assignee: Telediffusion de France, Paris, France

[21] Appl. No.: 152,389

[22] Filed: May 22, 1980

[30] Foreign Application Priority Data

May 23, 1979 [FR] France ................................ 79 13238

[51] Int. Cl.[3] .......................... G09G 1/16; H04N 5/44

[52] U.S. Cl. ...................................... 340/724; 358/147

[58] Field of Search .......................... 358/147, 85, 142; 340/724

[56] References Cited

U.S. PATENT DOCUMENTS 4,233,628 11/1980 Ciciora ................................ 358/147

*Primary Examiner*—John C. Martin

*Attorney, Agent, or Firm*—Holman & Stern

[57] ABSTRACT

A method of aligning videotex characters on the screen of a television set, said characters being arranged in horizontal rows each occupying a number of scanning lines, wherein the vertical dimension of the characters and therefore of the rows may be doubled by repetition of the display of a line in the following line, said method comprising the steps of reading the data of a row during the scanning of the first, not displayed, line of said row and adjusting the alignment of the characters in accordance with the read data.

4 Claims, 2 Drawing Figures

METHOD OF ALIGNING VIDEOTEX CHARACTERS AND DEVICE FOR CARRYING OUT SUCH A METHOD

Figure 1A:
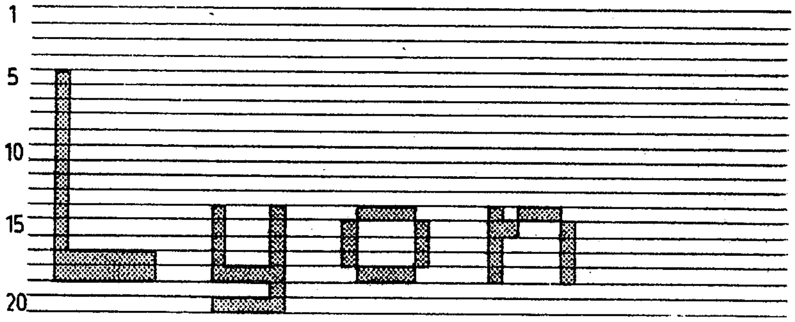

The present invention relates to a method of aligning videotex characters on the screen of a television set. The invention also relates to a device for carrying out such a method.

A videotex system is disclosed in French patent application No. 2,363,949. In such a system, the display of characters on the screen of the television set is controlled by a character generator supplied with data by a page memory.

The characters are arranged in horizontal rows each occupying a number of scanning lines, equal to 10 according to the ANTIOPE specification.

Insofar as alphabetic characters are concerned, it is desirable to dispose them as low as possible with respect to the row. But some characters namely lower case letters have descending portions extending below the common character body such as y, p, q, j, g, and the alignment of lower case letters with the characters of other types requires that the character bodies be offset upwards with respect to the bottom of the row. Under such circumstances, with a row composed of 10 scanning lines, taking into account that no display occurs on the first line of each row, the 9 remaining lines will be divided into 5 lines for the character bodies, 2 lines for the descending portions and 2 lines for the ascending portions of upper case letters such a 1, d and t.

The ANTIOPE system further provides the possibility of doubling the height of the characters by repeating the display of a scanning line in the following line. If the row, then composed of a double number of lines, contains both single height (1H) characters and double height (2H) characters, the above-recited concept will lead to a marked misalignement since the 2H lower case characters will have 4-line high descending portions, and a 2-line offset between 1H-letters and 2H-letters will result, sufficient to be ascertained by the viewer and hence unacceptable.

To overcome this drawback, the invention proposes to read the data of a row during the scanning time of the first, not displayed, line of said row and to adjust the alignement of the characters in accordance with the read data.

More specifically, during the scanning time of the first line of each row, there is ascertained (1) whether the row is only composed of 2H characters, or not, and (2) whether it contains at least one 2H lower case character, and the alignment is defined as follows:

(a) if the row only contains 2H characters, the alignment is offset upwards by 2 lines with respect to the alignment of 1H characters;

(b) if the row contains both 1H and 2H characters, and contains no 2H lower case character, the alignment is the same as in the case of 1H characters;

(c) if the row contains both 1H and 2H characters, and has at least one 2H lower case character, the alignment of the 2H characters is offset upwards by 1 line with respect to the alignment of 1H characters, and the last line of the 2H lower case character is not repeated.

Owing to the consideration of the above-defined criterion (1) and (2) during scanning of the first line, a satisfactory alignment is achieved in any event. In case (c), the offset between the alignement of 2H characters and that of 1H character is only 1 line and is thus not perceptible by the viewer.

The invention will be made clear from the following description taken in conjunction with the annexed drawings.

Figure 1B:
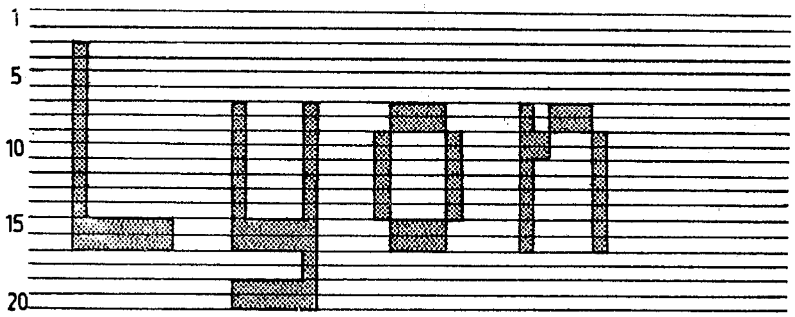
Figure 1C:
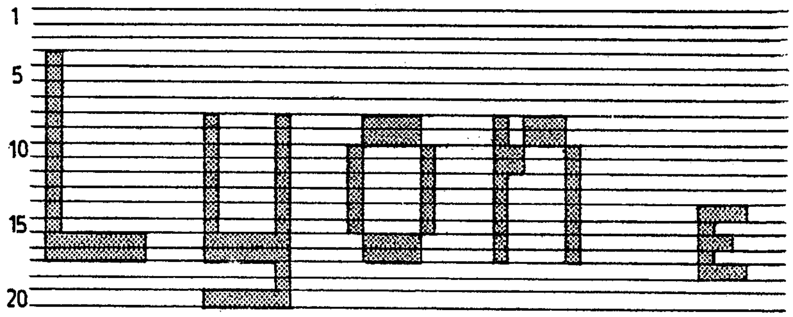
Figure 2:
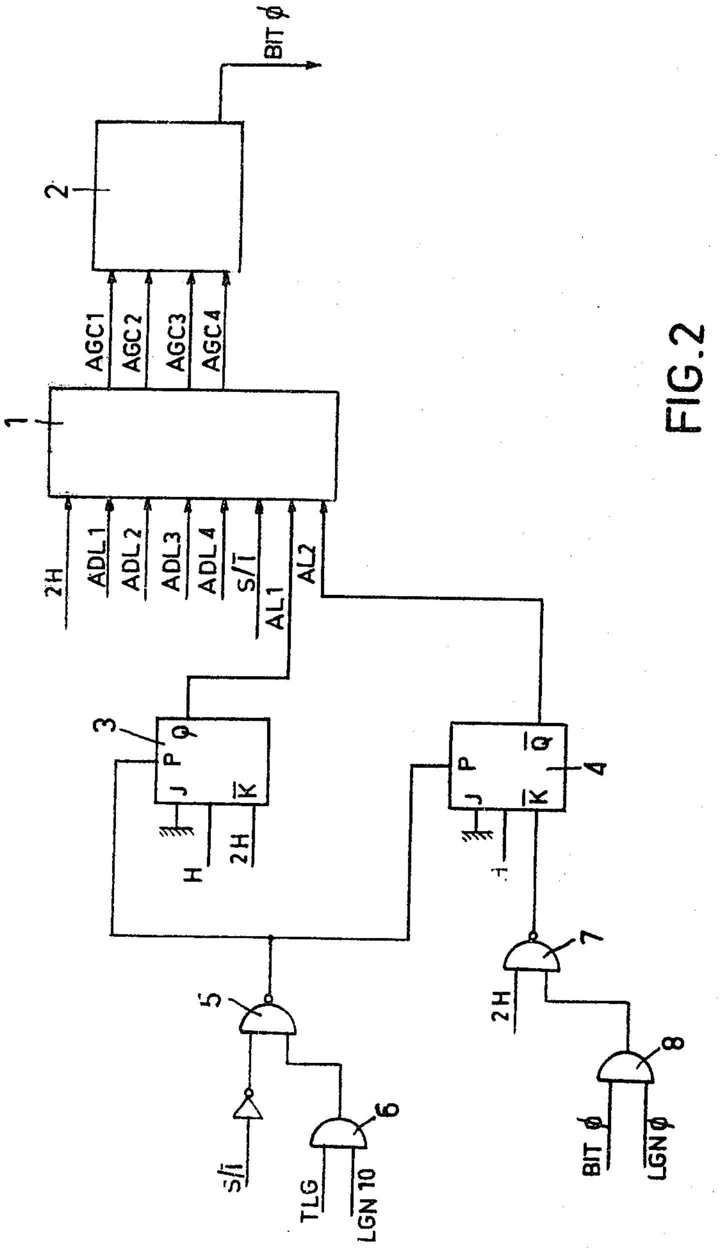

FIGS. 1*a* to 1*c* show examples of the various alignment modes provided by the invention;

FIG. 2 shows a diagram of a device for achieving the alignment modes of FIGS. 1*a* to 1*c*.

FIGS. 1*a* to 1*c* show part of the screen of a television set used for display of written text, on which e.g. the word LYON appears. In the ANTIOPE system, a row of characters usually occupies 10 scanning lines, but the present specification only contemplates the cases where the row includes one or more double height (2H) characters and has accordingly a double height, i.e. 20 scanning lines. The scanning lines are therefore numbered from 1 to 20 in each of FIGS. 1*a* to 1*c*.

The alignment mode shown in FIG. 1*a* is identical with that of rows only including 1H characters, namely, the character bodies are arranged with a 2-line offset with respect to the bottom of the row, said offset corresponding to the height of the descending portion or tail of a 1H character. Such an alignment mode is employed when 1H characters (Y,O,N) and 2H characters (L) are present in one row and no 2H lower case letter is present. As shown in FIG. 1*a*, 2H characters are obtained by merely repeating the display of one line in the following line.

The alignment mode of FIG. 1*b* is utilized when the row is exclusively composed of 2H characters. In such a case, the alignment is offset by 2 lines with respect to the preceding case, whether the row incorporates lower case letters or not. In other words, the character bodies are spaced by 4 lines from the bottom of the row, the space thus defined accommodating the descending portions the height of which is 4 ines (2×2).

Finally, the alignment mode shown in FIG. 1*c* is employed in the case where a row includes both 1H and 2H characters and at least one 2H character is a lower case letter. This alignment mode consists of offsetting the bodies of 2H characters by 3 lines with respect to the bottom of the row while suppressing the repetition of the second display element of the descending portions. It will be clear from FIG. 1*c* that the horizontal stroke of the descending portion of the Y is not doubled, in contrast to the pattern shown in FIG. 1*b*.

Further, the 1H characters present in the row are normally disposed, namely, the bodies of 1H characters are offset by 2 lines from the bottom of the row. The resulting offset between 1H and 2H characters is not disturbing for the viewer as it is limited to one line.

The selection of the alignment mode thus requires the knowledge of two parameters pertaining to the row in consideration. The first parameter AL1 is related to the simultaneous presence of 1H and 2H characters, and the second parameter to the presence of 2H lower case letters.

Parameters AL1 and AL2 are determined by reading the character data of the row during the scanning of the first line of the row, which is never utilized for data display so as to define a clear separation between the characters of successive rows.

FIG. 2 shows a device which allows parameters AL1 and AL2 to be taken in account for the purpose of selecting the alignment mode.

The device shown in FIG. 2 comprises a PROM memory 1 which delivers to the character generator 2 a reading sequence via four wires AGC1 to AGC4 for the control of the alignment mode.

The memory 1 receives via four wires ADL1 to ADL4 the line address of the row in consideration, ranging from 0 to 9, which line address is supplied by a line counter incremented at each line synchronization pulse.

The memory 1 receives a signal 2H indicating that the read character has a double height, and a signal $S/\overline{I}$ indicating whether the row is the upper or the lower half of a double height row.

The memory further receives signals AL1 and AL2 derived from flip-flops 3 and 4, respectively. Flips-flops 3 and 4 are $J\overline{K}$ type flip-flops.

The input J of flip-flop is a "0".

Its input $\overline{K}$ receives signal 2H indicating that the read character is a 2H character.

Its input P (Preset) is connected to an AND-NO gate 5 which receives the output from an AND gate 6 to which are applied the line synchronization pulses TLG and signal LGN10 which appears when scanning the 10th line of each row.

Gate 5 further receives the interval signal $S/\overline{I}$ which is a "1" when reading the lower half of a double height row.

The signal fed to input P is therefore changed to a "0" at the occurrence of the line sync pulse of the last line of the row which precedes the row to be read. Taking in account signal $S/\overline{I}$ avoids an undesirable change in state of flip-flop 3 when passing from the upper half to the lower half of a double height row.

A clock signal H is fed to flip-flop 3 at each character time slot.

The output of flip-flop 3 is changed to a "1" at the occurrence of the line sync pulse TLG of the last line LGN10 of the preceding row, and remains in such a state if all the characters of the row are 2H. But if even a single character is 1H, the state of signal 2H is changed to a "0". Output Q is then changed to a "0".

Flip-flop 4 has its input P also connected to the output of gate AND-NO 5.

The inputs J and H are connected in the same manner as in flip-flop 3.

The input $\overline{K}$ is connected to a gate AND-NO 7 receiving at one input signal 2H and having its other input connected to an AND gate 8 which receives a signal BITϕ supplied by the character generator and indicating that the read character is a lower case letter, and a signal LGNϕ indicating that the line being read is the first one of the row.

When signal AL1 is a "1", the alignment mode is that shown in FIG. 1*b*.

When signal AL1 is a "0" and signal AL2 is a "0", the alignment mode is that shown in FIG. 1*a*.

When finally signal AL1 is a "0" and signal AL2 is a "1", the alignment is as shown in FIG. 1*c*.

What we claim is:

1. A method of aligning characters on the screen of a television receiver, wherein single height (1H) characters are arranged in horizontal rows each occupying ten scanning lines, wherein a downstroke of a 1H character has a vertical dimension of two lines, and wherein the vertical dimension of the characters and therefore of the rows may be doubled by repetition of the display element of a line over the following line, said method being characterized by the steps of:

ascertaining, during the scanning time of the nondisplayed first line of each row, (1) whether or not the row is only composed of double height (2H) characters, and (2) whether or not the row contains at least one 2H character, with downstroke, and defining then the alignment as follows:

(a) if the row only contains 2H characters, the alignment is offset upwards by two lines with respect to the alignment of 1H characters;

(b) if the row contains both 1H and 2H characters, and contains no 2H character with downstroke, the alignment is the same as in the case of 1H characters;

(c) if the row contains both 1H and 2H characters, and contains at least one 2H character with downstroke, the alignment of the 2H characters is offset upwards by one line with respect to the alignment of 1H characters, and the last line of the 2H character with downstroke is not repeated.

2. A device for aligning characters on the screen of a television receiver, wherein single height (1H) characters are arranged in horizontal rows each occupying ten scanning lines, wherein a downstroke of a 1H character has a vertical dimension of two lines, wherein the vertical dimension of the characters and therefore of the rows may be doubled by repetition of the display element of a line over the following line, said device being intended to supply to a character generator a reading sequence defining the alignment of the characters, said device being characterized in that it further comprises:

a PROM memory having an output connected to the character generator;

a line counter for providing a sequence to said PROM memory;

means for generating a signal indicating that the read character is a double height (2H) character;

means for generating a signal indicating whether the upper half or the lower half of a double height row is concerned;

means for generating a signal AL1 which is at logic level "1" when all of the characters of the row are 2H and a signal AL2 which is at logic level "1" when the row contains at least one 2H character with downstroke;

said PROM memory including means for controlling a two-line offset of the alignment with respect to the alignment of the 1H characters when signal AL1 is at level "1" and a one-line offset when AL1 is at level "0" and AL2 is at level "1", the offset being nil otherwise.

3. The device according to claim 2, further comprising:

a first flip-flop for supplying signal AL1, said first flip-flop having an output which is set to logic level "1" in response to the occurrance of a line synchronization pulse in the last line of the preceding row, and which is changed to logic level "0" if one character of the row is 1H; and a second flip-flop for supplying signal AL2, said second flip-flop having an output which is set to logic level "1" when a 2H character with downstroke is contained within the row.

4. A device according to claim 3, wherein the character generator includes means for supplying a signal indicative of a downstroke of a character.

* * * * *

UNITED STATES PATENT AND TRADEMARK OFFICE

CERTIFICATE OF CORRECTION

PATENT NO. : 4,321,596

DATED : March 23, 1982

INVENTOR(S) : CHARLES HERNANDEZ, et al.

It is certified that error appears in the above—identified patent and that said Letters Patent is hereby corrected as shown below:

On the title page

" [73] Assignee: Telediffusion de France, Paris, France"

SHOULD BE:

-- [73] Assignee: Telediffusion De France, Paris, France and Compagnie Continentale De Signalisation Orly, France --.

Signed and Sealed this

Twenty-sixth Day of October 1982

[SEAL]

Attest:

GERALD J. MOSSINGHOFF

Attesting Officer

Commissioner of Patents and Trademarks